United States Patent [19]
Scheps

[11] Patent Number: 5,119,394
[45] Date of Patent: Jun. 2, 1992

[54] TECHNIQUE FOR LONGITUDINAL OPTICAL PUMPING OF A LASER

[75] Inventor: Richard Scheps, Del Mar, Calif.

[73] Assignee: The United States of America as represented by the Secretary of the Navy, Washington, DC

[21] Appl. No.: 655,886

[22] Filed: Feb. 13, 1991

[51] Int. Cl.$^5$ ............................................ H01S 3/093
[52] U.S. Cl. ........................................ 372/75; 372/70
[58] Field of Search ...................... 372/69, 70, 71, 72, 372/75, 90, 100

[56] References Cited

U.S. PATENT DOCUMENTS

| | | | |
|---|---|---|---|
| 3,936,770 | 2/1976 | Reintjes Jr. et al. | 372/27 |
| 4,032,861 | 6/1977 | Rothrock | 331/94.5 C |
| 4,475,201 | 10/1984 | Chiu | 372/53 |
| 4,514,849 | 4/1985 | Witte et al. | 372/29 |
| 4,732,505 | 5/1973 | Freedman | 372/75 |
| 4,791,927 | 12/1988 | Menger | 128/303.1 |
| 4,794,615 | 12/1988 | Berger | 372/69 |
| 4,811,349 | 3/1989 | Payne et al. | 372/41 |
| 4,852,567 | 8/1989 | Sinofsky | 128/303.1 |
| 4,901,330 | 2/1990 | Wolfram | 372/75 |
| 4,908,832 | 3/1990 | Baer | 372/75 |
| 4,910,746 | 3/1990 | Nicholson | 372/68 |
| 4,922,502 | 5/1990 | Unternahrer et al. | 372/66 |
| 4,942,587 | 7/1990 | Suzuki | 372/75 |

OTHER PUBLICATIONS

R. Scheps et al., "Alexandrite laser pumped by semiconductor lasers", Appl. Phys. Lett. 56(23), Jun. 4, 1990, pp. 2288-2290.

Scheps, Richard et al., "Laser Diode-Pumped Tunable Solid State Laser", Proceedings Reprint, SPIE, vol. 1223, pp. 189-195, Jan. 15-17, 1990.

Scheps, R., "Efficient Laser Diode Pumped Nd Lasers", *Appl. Opt.* 28, pp. 89-91, Jan. 1989.

Walling, J. C. et al., "Tunable Alexandrite Lasers", *IEEE J. Quant. Electron.* QE-16, pp. 1302-1315, Dec. 1980.

Kumagai, O. et al., "680 nm AlGaInP Visible Lasers Grown by MOCVD", Proceedings of the SPIE, L. E. Cramer et al. editors, vol. 898, pp. 80-83, SPIE Billingham, 1988.

Findlay, D. et al., "The Measurement of Internal Losses in Four-Level Lasers", Phys. Lett. 20, pp. 277-278, Feb. 1966.

*Primary Examiner*—James W. Davie
*Attorney, Agent, or Firm*—Harvey Fendelman; Thomas G. Keough

[57] ABSTRACT

A technique and apparatus employs a plurality of laser pumping emissions fed as collimated parallel beams from a multi-faceted reflective solid with highly reflective faces into a single aperture lens to concentrate all the laser pumping emissions onto a spot on the face of the laser crystal for the responsive longitudinal pumping thereof.

11 Claims, 1 Drawing Sheet

TECHNIQUE FOR LONGITUDINAL OPTICAL PUMPING OF A LASER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This application is related to a co-pending U.S Pat. application Ser. No. 07/639,645 entitled "Laser Diode Pumped Tunable Solid State Laser" filed 10 January 1991.

BACKGROUND OF THE INVENTION

Longitudinal pumping of Nd:YAG by laser diodes is well established, producing excellent performance in terms of power and efficiency, see the article by R. Scheps, entitled "Efficient Laser Diode Pumped Nd Lasers," *Appl. Opt.* 28, pp. 89–91, January 1989. Alexandrite, which is chromium-doped chrysoberyl (Cr:BeAl$_2$O$_4$) is a tunable visible laser that operates between 700 and 820 nm and would be ideally suited for a number of applications if acceptable efficiency could be demonstrated, note the article by J. C. Walling et al. entitled "Tunable Alexandrite Lasers," *IEEE J. Quant. Electron.* OE-16, pp. 1302–1315, December 1980. With the recent introduction of commercial 5 mW laser diodes operating in the 670–680 nm range, diode pumping of alexandrite is now possible but requires combining the output of several such devices. Higher power visible diodes are reported by O. Kumagai et al. in their article, "680 nm AlGaInP Visible Lasers Grown by MOCVD," *Proceedings of the SPIE*, L. E. Cramer et al. editors, Vol. 898, pp. 80–83, SPIE Bellingham, 1988.

Polarization combining is a well used technique to combine two laser diodes to pump a Nd resonator. However, if more than two laser diodes are required, or if polarization combination is not an effective way to pump the laser rod, another technique must be relied upon.

Thus, a continuing need exists in the state of the art for a technique that enables the combination of a plurality of laser pumping sources to longitudinally pump a solid state laser that is practical and efficient.

SUMMARY OF THE INVENTION

A plurality of parallel laser beams are fed into a single aperture lens or small aperture lens with a beam compressor (that is, a beam expander used backwards) to concentrate all the laser light onto the face of a laser crystal within a laser. In one configuration, a pair of diametrically opposed laser diodes each emits pumping light through a pair of collimator lenses so that each collimated beam impinge on a separate highly reflective angled side of a prism. The highly reflective angled sides of the prism reflect parallel collimated beams to a concentrating lens where the parallel collimated beams are focused onto a small sized spot on a face of a laser crystal to effect an efficient longitudinal pumping thereof More than two collimated laser beams may be directed to the concentrating lens when a pyramid-shaped prism, side-by-side-wedge-shaped prisms or other appropriate configurations are selected so that each of the collimated beams each impinge on a separate highly reflective angled face and all are reflected as parallel collimated beams to the concentrating lens.

An object of the invention is to provide for the combination of the energies of a number of laser pumping sources.

An object of the invention is to provide for the combination of the energies of a number of laser pumping sources for the longitudinal pumping of an active laser element.

Another object is to provide for the combination of a plurality of laser pumping sources by directing a plurality of parallel collimated beams through a common focusing lens for concentration of the aggregate pumping energies onto a small spot size on an active laser element.

These and other objects of the invention will become more readily apparent from the ensuing specifications and drawings when taken in conjunction with the appended claims.

DESCRIPTION OF THE PREFERRED EMBODIMENT

Figure 1:
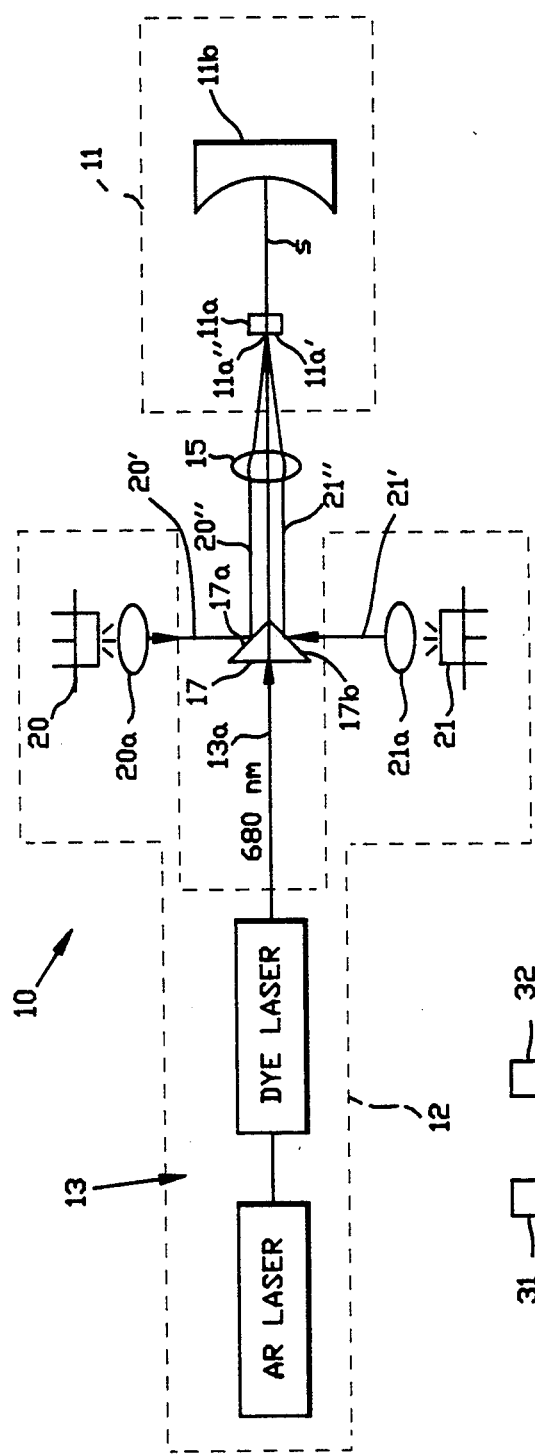
FIG. 1 is a side view schematic diagram of this invention that enables the combination of a plurality of laser pumping sources to longitudinally pump a laser.
Figure 3:
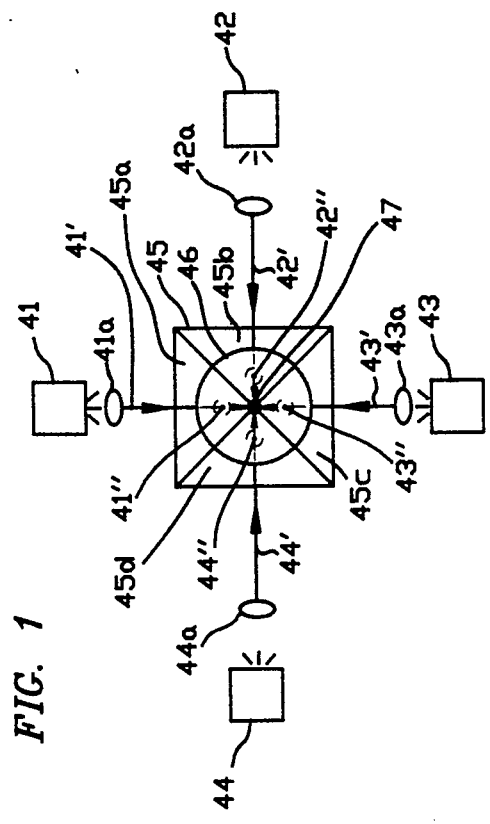
FIG. 3 is an end view of yet another arrangement utilizing a pyramid-shaped lens for reflecting four orthogonally originated collimated laser diode pumping beams into a mutually parallel collimated paths to a focusing lens.

A solid state laser 10 has a laser resonator 11 and pumping arrangement 12 arranged as depicted in FIG. 1. The resonator has an active element 11a and mirror 11b which are appropriately selected from available materials and suitably disposed with a separation s for longitudinal pumping for lasing.

The pumping arrangement includes an argon-ion pumped laser 13 operating at a predetermined wavelength to emit a beam 13a. Dye laser beam 13a is appropriately located to pass just above the top surface of coupling prism 17 to a focusing lens 15 where it is refracted to a focused small sized spot 11a'' on an exterior face 11a' of active element 11a of laser resonator 11.

In this configuration, the path taken by beam 13a may be said to define the pumping axis to the active laser element of the laser resonator 11. Ideally, beam spot 11a'' is circular. However, in practice an essentially elliptically-shaped spot has been produced and, typically, is dimensioned to measure about 27 microns by about 40 microns along its two axes and, with a typical predetermined dye laser pumping wavelength, has a spectral bandwidth of about 40 GHz. Certainly, other spot shapes and sizes are possible and can be employed satisfactorily in accordance with this inventive concept.

Directing and focusing beam 13a on exterior face 11a' in small sized spot 11a'' helps effect the longitudinal pumping of active laser element 11a.

Two laser diodes 20 and 21 are disposed with their front facets perpendicular to the pumping axis of dye laser 13 (path of beam 13a). The emissions of each diode 20 and 21 are transformed into collimated beams 20' and 21' by a separate interposed collimating lens 20a and 21a which also are aligned to direct collimated beams 20' and 21' to a separate face 17a and 17b of a prism 17. From the face 17a and 17b of prism 17 impinging collimated beams 20' and 21'0 are reflected as parallel collimated beams 20" and 21" to focusing lens 15.

The prism depicted is essentially wedge-shaped with 45° faces which are highly reflective of the impinging collimated beams to reflect them as parallel collimated beams 20" and 21" to focusing lens 15. These parallel collimated beams 20" and 21" are also parallel with beam 13a so that focusing lens 15 focuses all three of the beams in essentially the same spot 11a" on exterior face 11a' of active element 11a. This focusing of the three beams in essentially the same spot assures a sufficient collective longitudinal pumping source for the active element.

The 45° angular disposition of the highly reflective faces is appropriate for this particular location and orientation of pumping diodes 20 and 21. Other highly reflective prisms having other angular dispositions of their faces could be selected to direct parallel collimated beams to a focusing lens if the collimated pumping diode beams were coming from locations or directions other than that shown in FIG. 1.

The plane of the output polarization of both the laser diodes is parallel to that of dye laser beam 13a. The focusing lens is selected to refract the mutually parallel dye laser beam 13a and collimated beams 20" and 21" and focus them onto substantially the same spot 11a' on the active laser element 11a of the resonator 11. Optionally, a small aperture lens with a beam compressor (that is, a beam expander used backwards) could be selected to concentrate all the laser pumping light onto face 11a' of active element 11a laser crystal. In other words, when the proper optical alignment and orientation have been established by dye laser 13, laser diodes 20 and 21 and the highly reflective faces of prism 17, the beams of all three pumping sources are focused by an appropriate focusing means, for example, focusing lens 15, to a single spot 11a' on an exterior face 11a of the laser rod 11a.

Figure 2:
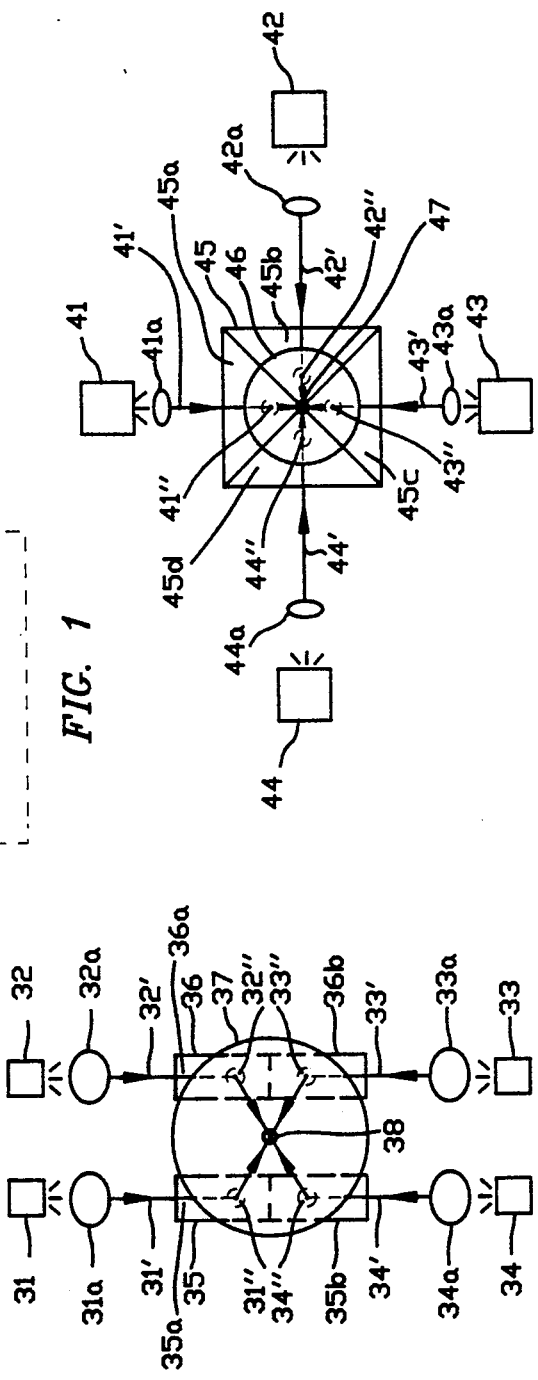
FIG. 2 is an end view of another arrangement of laser and coupling prisms in which two side-by-side, wedge-shaped prisms each receive two collimated laser diode beams and reflect them in mutually parallel paths to a focusing lens.

Only two laser diodes are shown in the example of FIG. 1. FIG. 2 is an end view to show four pumping laser diodes 31, 32, 33 and 34 emitting radiation that is collimated by appropriately interposed lens 31a, 32a, 33a and 34a to direct collimated radiation 31', 32', 33', 34' onto highly reflective faces 35a and 35b and 36a and 36b of a pair of juxtaposed prisms 35 and 36. The four impinging collimated beams 31', 32', 33' and 34' are reflected out of the paper toward a reader in collimated parallel beams 31", 32", 33", and 34" to a focusing lens 37 which focuses the four collimated parallel beams to an elliptically shaped spot 38 a distance from the focusing lens on the face of an active laser element (not shown).

Yet another configuration is depicted in FIG. 4 which shows four pumping laser diodes 41, 42, 43, and 44 emitting to collimating lenses 41a, 42a, 43a and 44a which direct collimated beams 41', 42', 43' and 44' to impinge upon a pyramid- shaped prism 45. Collimated beams 41', 42', 43' and 44' impinge on highly reflective faces 45a, 45b, 45c and 45d of the pyramid-shaped prism and are reflected out of the paper toward a reader in parallel collimated beams 41", 42", 43", and 44" to a focusing lens 46 which focuses the parallel collimated beams into an elliptically shaped spot 47 on a laser active element (not shown).

It is to be understood that other arrangements of laser diodes with collimated lenses can be geometrically coupled to one or more appropriately shaped prisms which direct collimated beams to a focusing lens which converges them onto a small sized spot at the proper place on an active laser element to ensure an effective longitudinal pumping. In all these other arrangements dye laser beam 13a can be included to impinge on the proper spot on the focusing lens to assure a coinciding with the focussed spot on the surface of the active laser element that is attributed to other pumping sources .

Thus, the use of a prism, several prisms or any geometric solid, a multi-faceted reflective solid, may be used that has highly reflective faces or surfaces which are appropriately oriented with respect to the incoming collimating pumping light to reflect parallel collimated pumping light to the focusing lens where it is focused in a small spot on the surface of the active laser element. Collimated laser pumping light emerging in parallel bundles from the prism to the focusing lens is a prerequisite for effective operation of this longitudinal pumping inventive concept.

Obviously, many other modifications and variations of the present invention are possible in the light of the above teachings. It is therefore to be understood that within the scope of the appended claims the invention may be practiced otherwise than as specifically described.

I claim:

1. An apparatus for concentrating laser pumping emissions onto the face of a laser active element comprising:

means for emitting a plurality of said pumping emissions;

a plurality of collimating lenses each interposed to collimate a separate one of said pumping emissions, the plurality of said pumping emissions means are at least a pair of laser diodes each oriented to direct their said pumping emissions in a generally converging direction each for a separate one of said collimating lens;

means disposed to receive each of the collimated pumping emissions on a separate highly reflective face for reflecting them as parallel collimated pumping emissions; and means interposed to receive the said parallel collimated pumping emissions for focusing said parallel collimated pumping emissions onto a spot on the surface of said active laser element to ensure the longitudinal pumping thereof, said pair of laser diodes direct their emissions to a separate one of said collimating lens and the reflecting means is an interposed prism which reflects their impinging collimated pumping emissions into said parallel collimated pumping emissions to said focusing means.

2. An apparatus according to claim 1 in which said prism is wedge-shaped element having said highly reflective faces appropriately oriented to assure said parallel collimated pumping emissions to said focusing means.

3. An apparatus according to claim 2 further including:

a plurality of pairs of laser diodes, each having a collimating lens optically associated therewith;

a plurality of prisms disposed in an essentially side-byside relationship, each pair of laser diodes is optically coupled to a separate one of said prisms which each reflects their impinging collimated pumping emissions into said mutually parallel collimated pumping emissions to said focusing means.

4. An apparatus according to claim 1 further including:
a plurality of pairs of laser diodes, each having a collimating lens optically associated therewith being optically coupled to a separate said prism which is essentially pyramid shaped and is oriented so that the highly reflective faces thereof reflect their impinging collimated pumping emissions into said parallel collimated pumping emissions to said focusing means.

5. An apparatus according to claim 1 further including:
a plurality of laser diodes, each having a collimating lens optically associated therewith being optically coupled to said prism which is geometrically-shaped having a plurality of highly reflective faces, the geometrically-shaped prism is oriented so that its highly reflective faces reflect their impinging collimated pumping emissions into said parallel collimated pumping emissions to said focusing means.

6. An apparatus according to claim 1 further including:
a plurality of laser diodes, each having a collimating lens optically associated therewith being optically coupled to a multi-faceted reflective solid having a plurality of highly reflective faces, the multi-faceted reflective solid is oriented so that its highly reflective faces reflect their impinging collimated pumping emissions into said parallel collimated pumping emissions to said focusing means.

7. An apparatus according to claim 1, 2, 3, 4, 5, or 6 in which said focusing means is a focusing lens.

8. An apparatus according to claim 1, 2, 3, 4, 5, or 6 in Which said focusing means is a small aperture lens with a beam compressor (that is, a beam expander used backwards).

9. A method for concentrating laser pumping emissions on the face of a laser active element to assure the longitudinal pumping thereof comprising:
emitting a plurality of said pumping emissions;
collimating said pumping emission with a plurality of interposed collimating lens, said pumping emissions are from a plurality of laser didoes each oriented to direct their said pumping emissions in a generally converging direction through a separate collimating lens;
reflecting the collimated pumping emissions on separate highly reflective faces to parallel collimated pumping emissions; and
focusing said parallel collimated pumping emissions onto a spot on the surface of said active laser element to ensure the longitudinal pumping thereof, said reflecting is by an interposed prism which reflects the impinging collimated pumping emissions from said highly reflective surfaces into said parallel collimated pumping emissions to permit said focusing.

10. A method according to claim 9 in which said reflecting is by said interposed prism which is wedge-shaped with said highly reflective faces appropriately oriented to assure said parallel collimated pumping emissions to permit said focusing.

11. A method according to claim 11 in which said reflecting is by a multi-faceted reflective solid with said highly reflective faces appropriately oriented to permit said parallel collimated pumping emissions to assure said focusing.

* * * * *